United States Patent Office 2,843,640
Patented July 15, 1958

2,843,640

HYDROCARBON CONVERSION PROCESS EMPLOYING A CATALYST PRETREATMENT

Gordon E. Langlois, El Cerrito, and Edward D. Noble, San Rafael, Calif., assignors to California Research Corporation, San Francisco, Calif., a corporation of Delaware No Drawing. Application September 30, 1955
Serial No. 537,890

7 Claims. (Cl. 260—683.15)

The present invention relates to an improved method for conducting hydrocarbon conversion processes that employ, as a catalyst, a thin film of mineral acid disposed upon an inert, non-porous, solid, silica-containing catalyst support.

It has long been known that mineral acids, especially concentrated sulfuric and phosphoric acids, are effective catalysts for the polymerization of olefins and the alkylation of benzene hydrocarbons with olefins. Among the several varieties of acid catalysts that have been employed in these reactions, one of the most successful is the so-called "acid film" type, with which the present invention is concerned. A description of this catalyst can be found in U. S. Patents Nos. 2,186,021, 2,135,793 and 2,579,433, while the use of this catalyst in particular hydrocarbon conversion reactions can be found in U. S. Patents Nos. 2,136,785 (olefin polymerization) and 2,713,600 (alkylation). Briefly, however, the acid film catalyst can be described as one wherein a thin film of a mineral acid (preferably phosphoric acid of a concentration of from about 90 to 116%, calculated as ortho-phosphoric acid) is disposed on the surface of an inert, non-porous, solid support. Although some supports such as high chrome, copper, or lead pellets are suitable for low temperature reactions, it has been found that, under all conditions encountered, silica-containing particles, particularly quartz, are considerably superior to other supports in all respects.

In normal commercial practice, the catalyst bed is prepared by filling a bed of from 4 to 35, and preferably from 28 to 35, mesh quartz particles with 75 to 80% $H_3PO_4$. After standing at ambient temperature, the excess acid is drained from the bed, leaving the desired acid film on the surface of the particles. This film is then dried to increase the acid concentration to a value of from about 90 to 116% $H_3PO_4$. The bed is then ready to go on stream.

It is an object of the present invention to improve those catalytic hydrocarbon conversion processes employing the acid-film type catalyst. It is a further object to provide an improvement to this particular type catalyst whereby the activity of the fresh catalyst is appreciably higher than that obtained heretofore. Other objects of the invention will become apparent from the following detailed description thereof.

We have found that hydrocarbon conversion processes employing as a catalyst a thin film of a concentrated mineral acid disposed upon an inert, non-porous, solid, silica-containing support, can unexpectedly be improved by pretreating the catalyst support prior to the disposition of the final, mineral acid film thereon by contacting the support for a period of at least 5 minutes with a quantity of mineral acid at a temperature of from about 100° to 700° F. By so pretreating the support, we have found that the catalyst activity will be higher than that obtained heretofore and that this improved activity will remain relatively constant from the beginning of the on-stream time until the catalyst activity begins to decline due to the normal deactivation attributable to the formation on the catalyst of coke and tarry materials.

According to the present invention, the fresh quartz or other silica-containing support is contacted with a mineral acid for a period of at least 5 minutes at a temperature of from about 100° to 700° F. We have found that strong mineral acids such as concentrated sulfuric, hydrochloric, and, particularly, phosphoric acids, are especially advantageous in that they are readily available and accomplish the desired pretreating action in a relatively short period of time. Thus, it has been found that when concentrated mineral acids are employed under relatively high temperatures (e. g., 350°–450° F.), treating periods of about 5 minutes are sufficient. However, even under these latter conditions (as well as with those involving less severe conditions), periods of from about 8 to 24 hours are normally preferred before draining off the pretreating acid so as to insure that any particular type of silica-containing support will be completely treated. While the pretreating operation can be conducted at temperatures of from about 100° to 700° F. (preferably 150° to 450° F.), it must be borne in mind that the conditions of time, temperature, and the particular concentration of the acid to be advantageously employed in the pretreating operation are dependent upon each other, as well as on the particular catalyst support. Thus, we have found that, in general, a combination of high acid concentration and high temperatures allows the treating time to be shorter than is the case where either the acid concentration or temperature, or both, are relatively low.

Once the catalyst pretreatment step of the present invention is complete, the treated support is water-washed to remove the treating acid and the final catalyst can then be prepared in the conventional fashion by dispersing the desired acid film thereon. Following such preparation of the catalyst, the hydrocarbon conversion reaction (e. g., olefin polymerization or alkylation) can then be initiated according to the manner outlined in the patents noted hereinbefore.

Illustrative of this invention, a series of pretreatments upon fresh quartz catalyst supports were made employing for each treatment an amount of acid equal in weight to the weight of the quartz. The conditions employed in each treating step, along with the results obtained, are summarized in Table I. The treated quartz supports were washed with water until acid-free and then, along with a quantity of untreated quartz particles, were contacted with 80% $H_3PO_4$, drained, and dried so that a film of 106% $H_3PO_4$ was disposed upon the supports. These catalysts were then separately contacted with a liquefied propylene-containing hydrocarbon feed at a temperature of 400° F., and a pressure of 250 p. s. i. g. From the data obtained in these polymerization reactions, the activity of each catalyst was determined and included in Table I. Although catalyst activity has been defined in some detail (see U. S. Patent 2,579,433), for the present case it is sufficient to say the higher the activity, the more effective the catalyst for the conversion reaction. all of the pretreating runs, the supports were quartz (99+% silica) with the following screen analysis (weight percent):

| | |
|---|---:|
| On 10 mesh | 0 |
| On 20 mesh | 0.3 |
| On 28 mesh | 34.9 |
| On 35 mesh | 59.7 |
| Other | 5.1 |

Table 1

|  | No treatment | Run 1 | Run 2 | Run 3 | Run 4 | Run 5 | Run 6 |
|---|---|---|---|---|---|---|---|
| Pretreatment Conditions: | | | | | | | |
| Acid and Concentration | | 86% $H_3PO_4$ | 86% $H_3PO_4$ | 86% $H_3PO_4$ | 86% $H_3PO_4$ | 36 N $H_2SO_4$ | 12 N HCl. |
| Temperature, °F | | 360 | 150 | 360 | 360 [1] | 225 | 150. |
| Time, Hours | | 16 | 24 | 1 | .25 [1] | 24 | 24. |
| Results: Catalyst Activity | 90 | 146 | 140 | 141 | 126 | 131 | 136. |

[1] In run 4 the support was contacted with 86% $H_3PO_4$ initially at a temperature of 70° F. and thereafter heated for 15 minutes to a temperature of 360° F.

By comparing the catalyst activity of the catalyst prepared from the untreated and treated quartz support, it can be seen that the activity of the catalyst with the treated support was in all cases considerably higher than that of the catalyst with the untreated support. This is particularly true in the case of phosphoric acid, even when a treating period of only one hour (run 3) is employed.

We claim:

1. In a hydrocarbon polymerization process wherein a liquefied propylene-containing hydrocarbon material is contacted with a catalyst comprising a thin film of a concentrated mineral acid disposed upon a fresh inert, non-porous, solid, silica-containing support, the improvement which comprises pretreating said fresh support, prior to the disposition of said mineral film acid thereon, by contacting the support for a period of at least 5 minutes with a mineral acid at a temperature of from about 100° to 700° F.

2. The improvement as described in claim 1, wherein the mineral acid employed in pretreating the catalyst support is concentrated phosphoric acid.

3. In a hydrocarbon polymerization process wherein a propylene-containing liquefied hydrocarbon material is contacted with a catalyst comprising a thin film of 75 to 116% ortho-phosphoric acid disposed upon a fresh inert, non-porous, solid, silica-containing support, the improvement which comprises pretreating said fresh support, prior to the disposition of said phosphoric acid film thereon, by contacting said support for a period of at least 5 minutes with a quantity of mineral acid at a temperature of from about 100° to 700° F.

4. The improvement as described in claim 3, wherein the catalyst support comprises fresh quartz particles.

5. The improvement as described in claim 4, wherein the catalyst support is pretreated with a quantity of concentrated phosphoric acid.

6. An improved process for preparing a fresh olefin polymerization catalyst which comprises contacting a fresh inert, solid, non-porous, silica-containing support for at least 5 minutes with a quantity of mineral acid at a temperature of from about 100° F. to 700° F., washing acid from said support, contacting said fresh water-washed support with a further quantity of mineral acid, draining acid from said support, and drying the resulting acid-containing material, to produce a catalyst comprising said support having thereon a film of acid of higher concentration than the concentration of said further quantity of acid.

7. A process for improving the catalytic activity of a fresh olefin polymerization catalyst, which comprises: acid pretreating a fresh inert, solid, non-porous, silica-containing support prior to the disposition of a final acid film thereon; said acid pretreated comprising the steps of contacting said support for at least 5 minutes with a quantity of mineral acid at a temperature of from about 100° F. to 700° F., and washing the treated support to remove treating acid; depositing said final film by contacting said washed support after treating with a further quantity of mineral acid, draining acid from said support, and drying the resulting acid-containing material, to produce a fresh catalyst comprising said support having thereon a film of higher concentration than the concentration of said further quantity of acid.

References Cited in the file of this patent

UNITED STATES PATENTS

| 2,579,433 | Holm et al. | Dec. 18, 1951 |
| 2,619,512 | Meerbott | Nov. 25, 1952 |
| 2,694,686 | Reeves et al. | Nov. 16, 1954 |